United States Patent
Oh et al.

(10) Patent No.: US 11,332,587 B2
(45) Date of Patent: May 17, 2022

(54) WINDOW FOR DISPLAY DEVICE AND DISPLAY DEVICE INCLUDING THE WINDOW

(71) Applicant: SAMSUNG DISPLAY CO., LTD., Yongin (KR)

(72) Inventors: Hyunjoon Oh, Yongin (KR); Sangil Park, Yongin (KR); Hyejin Oh, Yongin (KR); Jeongsub Lee, Yongin (KR); Minhoon Choi, Yongin (KR); Insun Hwang, Yongin (KR)

(73) Assignee: SAMSUNG DISPLAY CO., LTD., Gyeonggi-do (KR)

( * ) Notice: Subject to any disclaimer, the term of this patent is extended or adjusted under 35 U.S.C. 154(b) by 866 days.

(21) Appl. No.: 14/712,768

(22) Filed: May 14, 2015

(65) Prior Publication Data
US 2016/0108283 A1    Apr. 21, 2016

(30) Foreign Application Priority Data
Oct. 16, 2014   (KR) .......................... 10-2014-0140174

(51) Int. Cl.
*C08K 3/22*       (2006.01)
*C08J 7/04*       (2020.01)
*G02B 1/111*      (2015.01)
*C08J 7/046*      (2020.01)

(52) U.S. Cl.
CPC ............. *C08J 7/046* (2020.01); *C08J 7/0423* (2020.01); *C08K 3/22* (2013.01); *G02B 1/111* (2013.01)

(58) Field of Classification Search
CPC ...................................................... C08K 3/22
See application file for complete search history.

(56) References Cited

U.S. PATENT DOCUMENTS

| | | | |
|---|---|---|---|
| 6,211,931 B1* | 4/2001 | Fukao | C09K 19/544 349/74 |
| 6,227,669 B1* | 5/2001 | Tiao | F21V 5/007 353/31 |
| 2002/0192476 A1* | 12/2002 | Kambe | B32B 27/08 428/447 |

(Continued)

FOREIGN PATENT DOCUMENTS

| | | |
|---|---|---|
| JP | 2008-81728 | 4/2008 |
| KR | 10-2008-0049244 A | 6/2008 |

(Continued)

OTHER PUBLICATIONS

Van der Waals Bond information sheet., 3 pages, downloaded on Feb. 11, 2019 from https://www.nde-ed.org/EducationResources/CommunityCollege/Materials/Structure/waals.htm (Year: 2019).*

(Continued)

*Primary Examiner* — Ramsey Zacharia
(74) *Attorney, Agent, or Firm* — Kile Park Reed & Houtteman PLLC

(57) ABSTRACT

A window for a display device and a display device including the window, the window including a base member; and a coating layer, the coating layer being formed on at least one surface of the base member and including core particles; and at least one polymer ligand, the polymer ligand being grafted onto surfaces of the core particles and bonds the core particles to the base member.

17 Claims, 5 Drawing Sheets

(56) References Cited

U.S. PATENT DOCUMENTS

| | | | |
|---|---|---|---|
| 2003/0031438 A1* | 2/2003 | Kambe | B82Y 20/00 |
| | | | 385/122 |
| 2003/0227250 A1* | 12/2003 | Nee | C22C 5/06 |
| | | | 313/495 |
| 2010/0003501 A1 | 1/2010 | Liu et al. | |
| 2011/0120970 A1 | 5/2011 | Joo et al. | |
| 2011/0250442 A1 | 10/2011 | Castro et al. | |
| 2011/0278553 A1 | 11/2011 | Kwon et al. | |
| 2012/0070656 A1 | 3/2012 | Chung et al. | |
| 2012/0328875 A1 | 12/2012 | Schoneveld et al. | |
| 2013/0186466 A1 | 7/2013 | Hebrink et al. | |
| 2013/0302594 A1 | 11/2013 | Sugiyama et al. | |

FOREIGN PATENT DOCUMENTS

| | | |
|---|---|---|
| KR | 10-2011-0033254 A | 3/2011 |
| KR | 10-2011-0126378 A | 11/2011 |
| KR | 10-2012-0030968 | 3/2012 |
| KR | 10-2012-0103726 A | 9/2012 |
| KR | 10-2013-0139959 A | 12/2012 |

OTHER PUBLICATIONS

Choi et al., Toughening fragile matter: mechanical properties of particle solids assembled from polymer-grafted hybrid particles synthesized by ATRP, Soft Matter, 2012, 8, pp. 4072-4082. (Year: 2012).*

"Interfacial Colloid Brushes:Theory", http://rhenewa.eng.buffalo.edu/wiki/Interfacial_colloid_brushes:Theory.

Joseph A. Patterson, et al., "The analysis of solution self-assembled polymeric nanomaterials", Chem. Soc. Rev. vol. 43 pp. 2412-2425 (2014).

* cited by examiner

WINDOW FOR DISPLAY DEVICE AND DISPLAY DEVICE INCLUDING THE WINDOW

CROSS-REFERENCE TO RELATED APPLICATION

Korean Patent Application No. 10-2014-0140174, filed on Oct. 16, 2014, in the Korean Intellectual Property Office, and entitled: "Window For Display Device and Display Device Including the Window," is incorporated by reference herein in its entirety.

BACKGROUND

1. Field

Embodiments relate to a window for a display device and a display device including the window.

2. Description of the Related Art

Display devices may include a liquid crystal display (LCD) device, a plasma display panel (PDP), an organic light emitting display (OLED) device, a field effect display (FED) device, an electrophoretic display device, or the like. Such a display device may include a display module for displaying an image and a window member for protecting the display module.

SUMMARY

Embodiments are directed to a window for a display device and a display device including the window.

The embodiments may be realized by providing a window for a display device, the window including a base member; and a coating layer, the coating layer being formed on at least one surface of the base member and including core particles; and at least one polymer ligand, the polymer ligand being grafted onto surfaces of the core particles and bonds the core particles to the base member.

The base member may be formed of polyethylene terephthalate, polyimide, polycarbonate, polymethylmethacrylate, polyethylene, polyurethane, silicone, or polyisoprene.

A material constituting the polymer ligand may be identical to the material constituting the base member, or may be secondarily bonded with the base member via hydrogen bonding or van der Waals bonding.

The polymer ligand may have a number average molecular weight of 10,000 g/mol or greater.

The core particles may include a metal oxide, a metalloid oxide, a compound of a metal oxide, or a compound of a metalloid oxide.

The core particles may have a surface hardness of 5 H or harder.

The core particles may have a grain size of about 10 nm or greater.

The coating layer may have a thickness that is 10% or greater of a thickness of the base member.

The polymer ligand may be formed of a block copolymer.

The embodiments may be realized by providing a window for a display device, the window including a base member; and a coating layer, the coating layer being formed on at least one surface of the base member and including core particles; and at least one polymer ligand, the at least one polymer ligand being grafted onto surfaces of the core particles and having at least one reactive group at a terminal end thereof.

The base member may be formed of polyethylene terephthalate, polyimide, polycarbonate, polymethylmethacrylate, polyethylene, polyurethane, silicone, or polyisoprene.

A material constituting the polymer ligand may be identical to the material constituting the base member, or may be secondarily bonded with the base member via hydrogen bonding or van der Waals bonding.

The polymer ligand may have a number average molecular weight of 10,000 g/mol or greater.

The core particles may include a metal oxide, a metalloid oxide, a compound of a metal oxide, or a compound of a metalloid oxide.

The core particles may have a surface hardness of 5 H or harder.

The core particles may have a grain size of about 10 nm or greater.

The coating layer may have a thickness that is 10% or greater of a thickness of the base member.

The polymer ligand may be formed of a block copolymer.

The core particles of the coating layer may be discontinuously distributed on the base member.

The embodiments may be realized by providing a display device including the window according to an embodiment.

BRIEF DESCRIPTION OF THE DRAWINGS

Features will be apparent to those of skill in the art by describing in detail exemplary embodiments with reference to the attached drawings in which.

DETAILED DESCRIPTION

Figure 1:
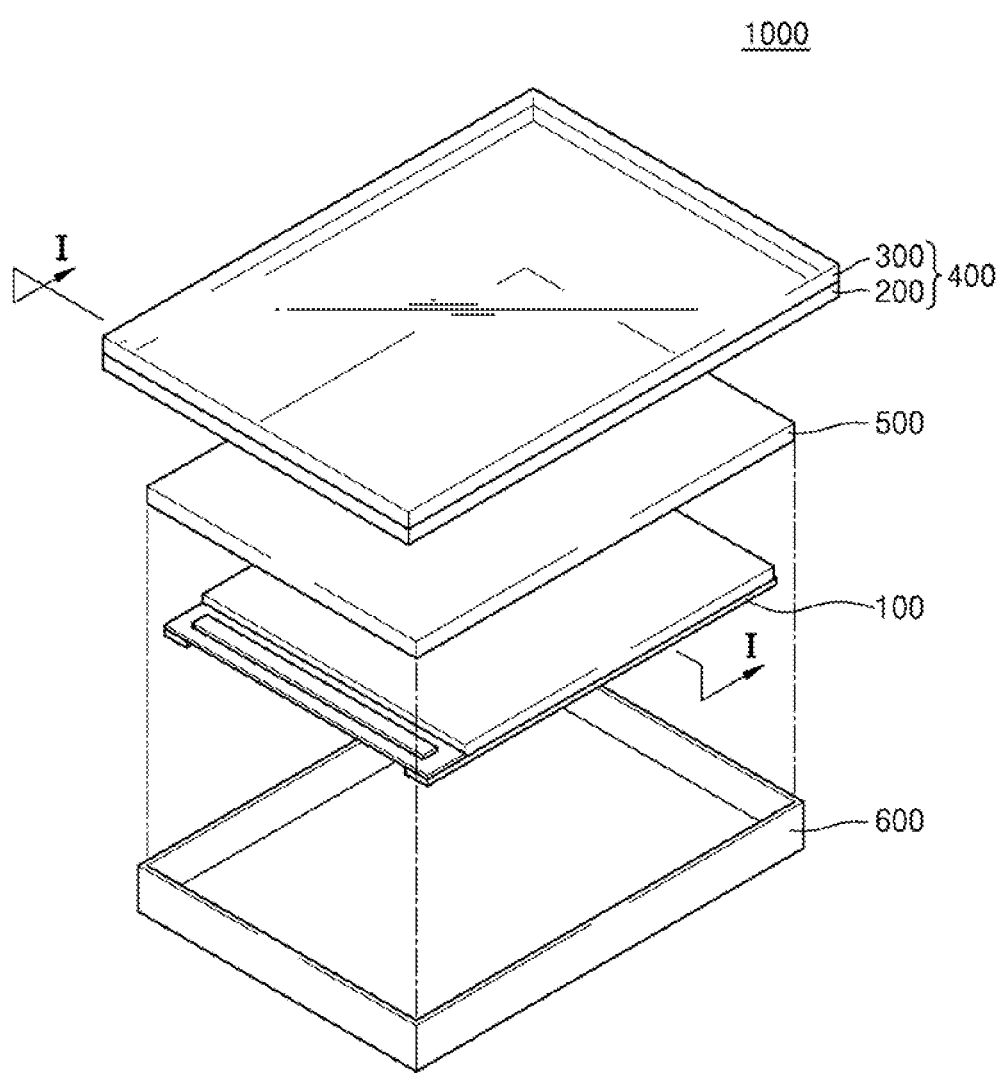
FIG. 1 illustrates a schematic exploded perspective view of a display device according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. Like reference numerals refer to like elements throughout.

While such terms as "first," "second," etc., may be used to describe various components, such components must not be limited to the above terms. The above terms are used only to distinguish one component from another.

It will be understood that when a layer, region, or component is referred to as being "on" or "formed on" another layer, region, or component, it can be directly or indirectly formed on the other layer, region, or component. For example, intervening layers, regions, or components may be present.

Figure 2:
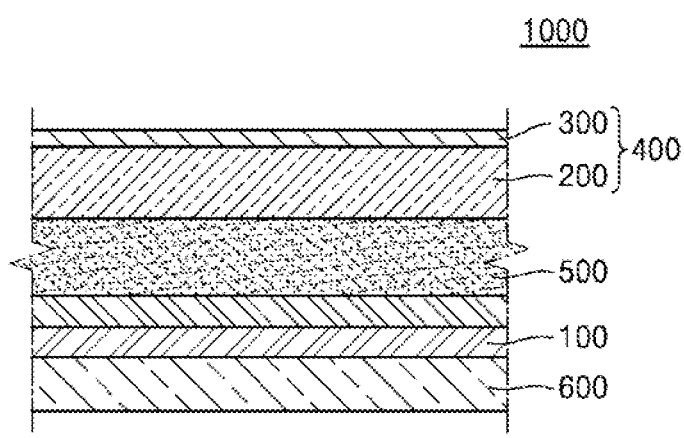
FIG. 2 illustrates a schematic sectional view of the display device, taken along a line I-I of FIG. 1.

FIG. 1 illustrates a schematic exploded perspective view of a display device according to an embodiment. FIG. 2 illustrates a schematic sectional view of the display device, taken along a line I-I of FIG. 1.

Referring to FIGS. 1 and 2, a display device 1000 according to an embodiment may include a display panel 100, a window 400, a resin layer 500, and a housing member 600.

The window 400 may include a base member 200 and a coating layer 300 formed on at least one surface of the base member 200.

The base member 200 may be formed of a material with high shock-resistance. For example, in consideration of material affinity with respect to the coating layer 300 described below, the base member 200 may be formed of a polymer material (such as polyethylene terephthalate (PET), polyimide (PI), polycarbonate (PC), polymethylmethacrylate (PMMA), or polyethylene (PE)), or an elastomeric polymer compound (such as polyurethane, silicone, or polyisoprene).

Figure 3:
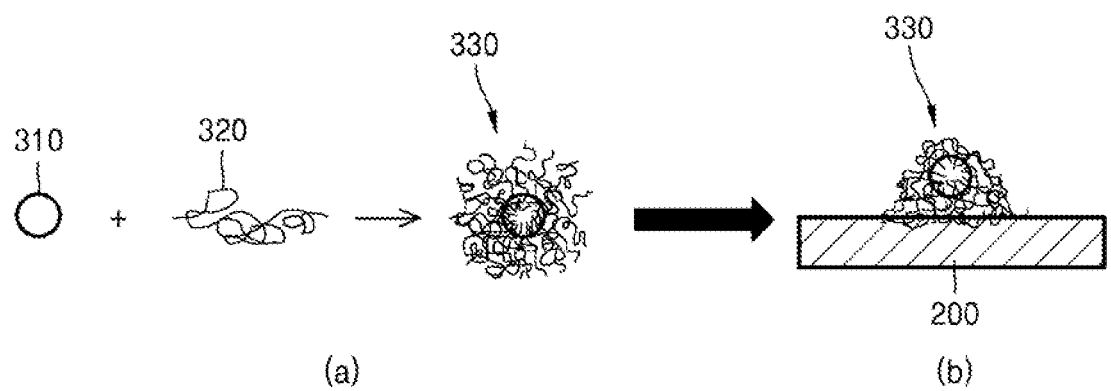
FIG. 3 illustrates a schematic diagram showing formation of a coating layer on a window for a display device according to an embodiment.

FIG. 3 illustrates a schematic diagram showing formation of a coating layer on a window for a display device according to an embodiment.

The coating layer 300 may include core particles 310 and at least one polymer ligand 320. For example, the at least one polymer ligand 320 may be grafted onto surfaces of the core particles 310 and may bond the core particles 310 to the base member 200.

Referring to FIG. 3, after the polymer ligand 320 is chemically grafted on surfaces of the core particles 310 as shown in (a) of FIG. 3, grafted core particles 330 (onto which the polymer ligand 320 has been grafted) may be bonded with the base member 200. For example, the bonding of the polymer ligand 320 (which is grafted onto surfaces of the core particles 310) to the base member 200 may be performed as the polymer ligand 320 and the base member 200 are chemically bonded with each other. For such chemical bonding, a material constituting the polymer ligand 320 may be identical to the material constituting the base member 200 or may be secondarily bonded with the base member 200 via hydrogen bonding or van der Waals bonding. In an implementation, any of various chemical bonding methods suitable for use as methods for graphing polymers may be used.

In an implementation, with a view toward facilitating grafting of the polymer ligand 320 on the core particles 310, the polymer ligand 320 and surfaces of the core particles 310 may contain, e.g., an acrylic group, a vinyl group, a hydroxyl group, a mercapto group, or the like.

Figure 4:
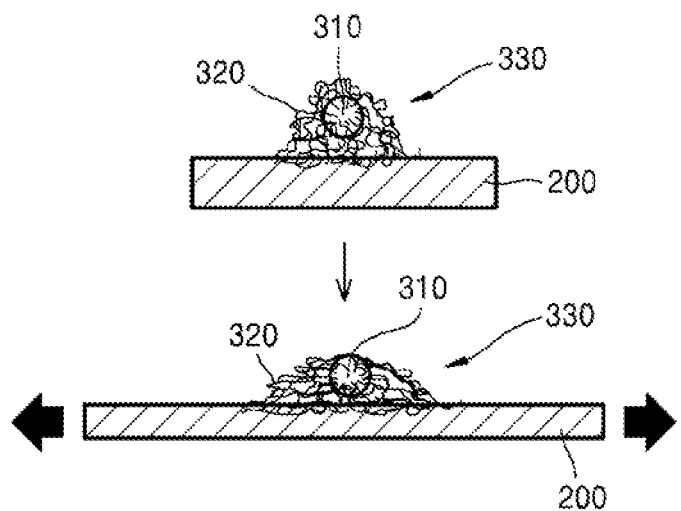
FIG. 4 illustrates a schematic diagram showing that, when an external force is applied to the window for a display device of FIG. 3, the base member of the window maintains flexibility.

FIG. 4 illustrates a schematic diagram showing that, when an external force is applied to the window for a display device of FIG. 3, the base member of the window maintains flexibility.

As shown in FIG. 4, if external forces, e.g., tensile forces, are applied to two opposite ends of the window 400, the polymer ligand 320 arranged between the core particles 310 and the base member 200 may help reduce stress applied to the core particles 310. Thus, the base member 200 may be sufficiently elongated in directions in which the tensile forces are applied without the core particles 310 being peeled off. For example, the polymer ligand 320 may help prevent flexibility indigenous or inherent to the base member 200 from being weakened by the core particles 310.

In an implementation, for the polymer ligand 320 to smoothly interact with the base member 200 and to help flexibility of the base member 200, a number average molecular weight of the polymer ligand 320 may be about 10,000 g/mol or greater.

In an implementation, the core particles 310 may contain a metal/metalloid compound or a compound of a metal/metalloid oxide to help provide excellent surface hardness to the coating layer 300. For example, the core particles 310 may have a surface (pencil) hardness equivalent to or of 5 H or higher (harder). For example, the core particles 310 may be or may include an oxide with high hardness, such as silica or alumina, or a compound of various other metal/metalloid oxides.

Although shapes of the core particles 310 are not limited, the core particles 310 may have any of various shapes including, e.g., a spherical shape, a tetrahedral shape, and/or a hexahedral shape, and/or may be formed to have a plate-like shape or a pillar-like shape.

In an implementation, a grain or particle size of the core particles 310 may be, e.g., about 10 nm or greater, with a view toward facilitating grafting of the polymer ligand 320 and handling during a manufacturing process. As an occasion demands, a grain size of the core particles 310 may be about 1 μm or greater. In an implementation, with a view toward helping to prevent adverse effects to coatability or light scattering, a grain size of the core particles 310 may be less than hundreds of μm.

Figure 5:
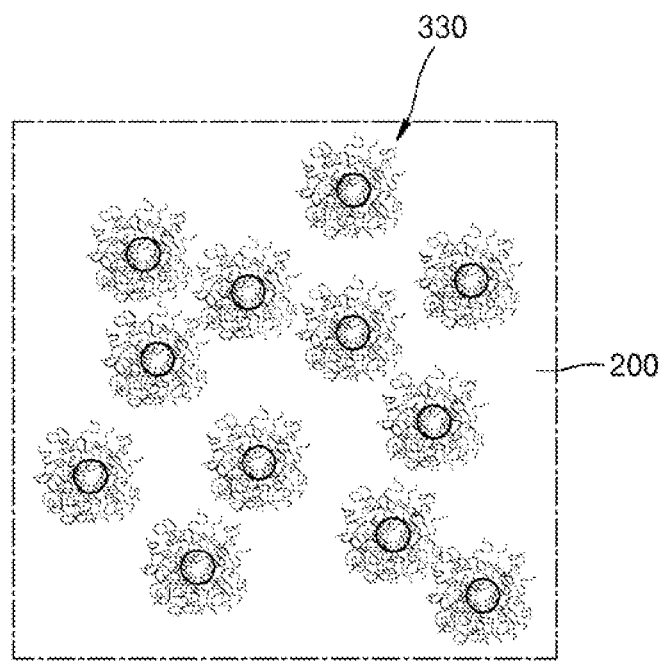
FIG. 5 illustrates a schematic plan view showing that a coating layer is formed in the window 400 of FIG. 3.

FIG. 5 illustrates a schematic plan view showing that the coating layer 300 is formed in the window 400 of FIG. 3.

Referring to FIG. 5, the grafted core particles 330 may be discontinuously distributed (e.g., in the coating layer 300) on the base member 200. As a result, even if external forces, e.g., bending forces or tensile forces, are applied to the window 400, the coating layer 300 may not restrict the front surface of the base member 200, and thus flexibility inherent to the base member 200 may be maintained. In addition, damage and/or peel-off of the hard core particles 310 (e.g., the coating layer 300) attached to the surface of the base member 200 may also be prevented.

A gap between the grafted core particles 330 of the coating layer 300 may be about 500 μm or smaller. For example, the gap may be adjusted to be smaller than a size of a stylus arranged at a surface roughness measuring device to help prevent damage to the base member 200 after measuring surface roughness.

In an implementation, with a view toward maintaining a surface hardness property of the window 400, a thickness of the coating layer 300 may be about 10% or greater of a thickness of the base member 200.

In an implementation, the coating layer 300 may be formed to have a stacked structure, where a gap between the grafted core particles 330 and a thickness of the coating layer 300 may be identical to the values stated above.

The core particles 310 may be randomly distributed on or in the coating layer 300, or may be cohesively or uniformly distributed in a lattice-like shape or a honeycomb-like shape. In an implementation, an anti-reflection effect may be obtained by distributing the core particles 310 on the base member 200 to have a moth-eye-like shape.

Figure 6:
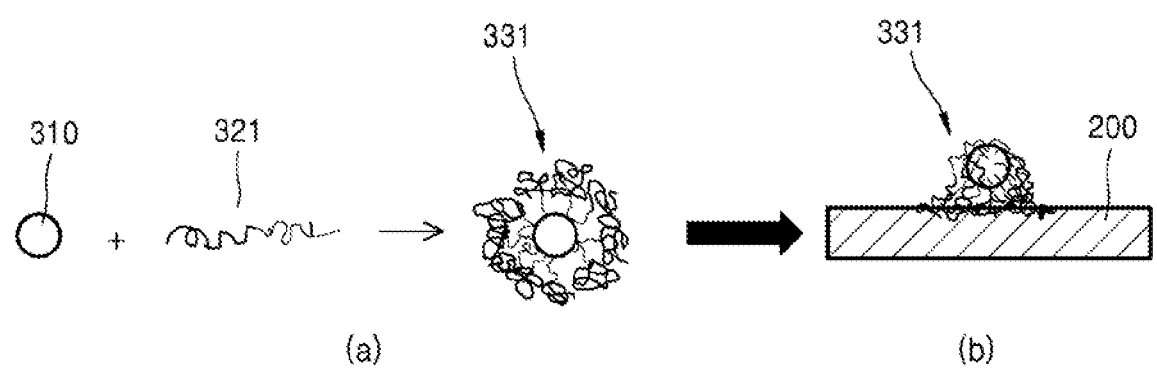
FIG. 6 illustrates a schematic diagram showing a modification of the embodiment of FIG. 3.

FIG. 6 illustrates a schematic diagram showing a modification of the embodiment of FIG. 3.

Referring to FIG. 6, a polymer ligand 321 grafted to surfaces of the core particles 310 may be formed of, may be, or may include a block copolymer. Processes in which the polymer ligand 321 is grafted to surfaces of the core particles 310 and grafted core particles 331 are bonded to the base member 200 are shown in (a) and (b) of FIG. 6.

For example, in terms of properties of respective blocks constituting the block copolymer, polymer blocks close to the core particles 310 may have relatively low flexibility and relatively high hardness, and polymer blocks close to the base member 200 may have relatively high flexibility and relatively low hardness. As described above, by applying the polymer ligand 321 formed of or including a block copolymer, flexibility and hardness between the base member 200 and the core particles 310 of the window 400 may be continuously adjusted.

Figure 7:
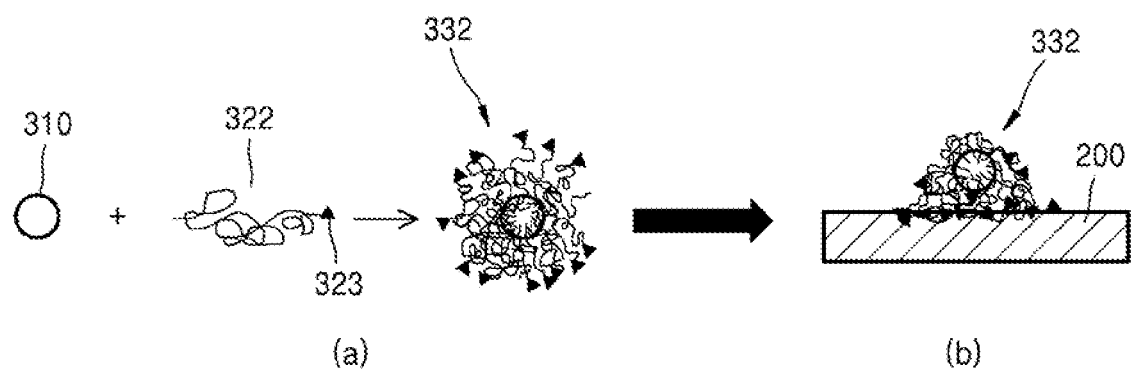
FIG. 7 illustrates a schematic diagram showing formation of a coating layer in a window according to another embodiment; and, FIG. 8 illustrates a diagram showing a portion of the display panel of FIG. 1 in closer detail.

FIG. 7 illustrates a schematic diagram showing formation of a coating layer 300 in a window 400 according to another embodiment.

Referring to FIG. 7, the window 400 according to another embodiment may include the base member 200 and the coating layer 300 formed on at least one surface of the base member 200.

The coating layer 300 may include the core particles 310 and a polymer ligand 322. The polymer ligand 322 may be grafted onto surfaces of the core particles 310 and may include at least one reactor or reactive group 323 at an end, e.g., terminal end, thereof. For example, the reactive group 323 may include an epoxy group, a vinyl group, a hydroxyl group, or the like.

For example, as shown in (a) of FIG. 7, the polymer ligand 322 having the reactive group 323 at the terminal end may be chemically grafted to surfaces of the core particles 310 to form grafted core particles 332, and crosslinking may be induced between the reactive group 323 of the polymer ligand 322 and a polymer constituting the base member 200, as shown in (b) of FIG. 7, thereby forming the more stable coating layer 300.

In an implementation, the crosslinking may be performed by hardening the polymer ligand 322 having the reactive group 323 at the terminal end at a particular temperature by using a crosslinking agent.

Furthermore, to facilitate crosslinking reaction between the polymer ligand 322 having the reactive group 323 at the terminal end and the base member 200, the polymer ligand 322 and surfaces of the base member 200 may contain an acrylic group, a vinyl group, a hydroxyl group, a mercapto group, or the like.

Hereinafter, referring back to FIGS. 1 and 2, components of the display device 1000 according to an embodiment other than the window 400 will be described.

The display panel 100 may be, e.g., a plasma display panel (PDP), an organic light emitting display (OLED) device, a field effect display (FED) device, an electrophoretic display device, or the like. Descriptions given below will focus on a case in which the display panel 100 is an organic light emitting display apparatus.

The display panel 100 may include an organic light emitting diode and displays an image by using self-luminescence of the organic light emitting diode. The display panel 100 may include substrates facing each other, and the organic light emitting diode may be located between the substrates facing each other. A wiring may be formed at one or more of the substrates facing each other, and the organic light emitting diode including a self-luminescent organic emission layer may emit a light due to the wiring. Therefore, an image may be displayed on the display panel 100.

Figure 8:
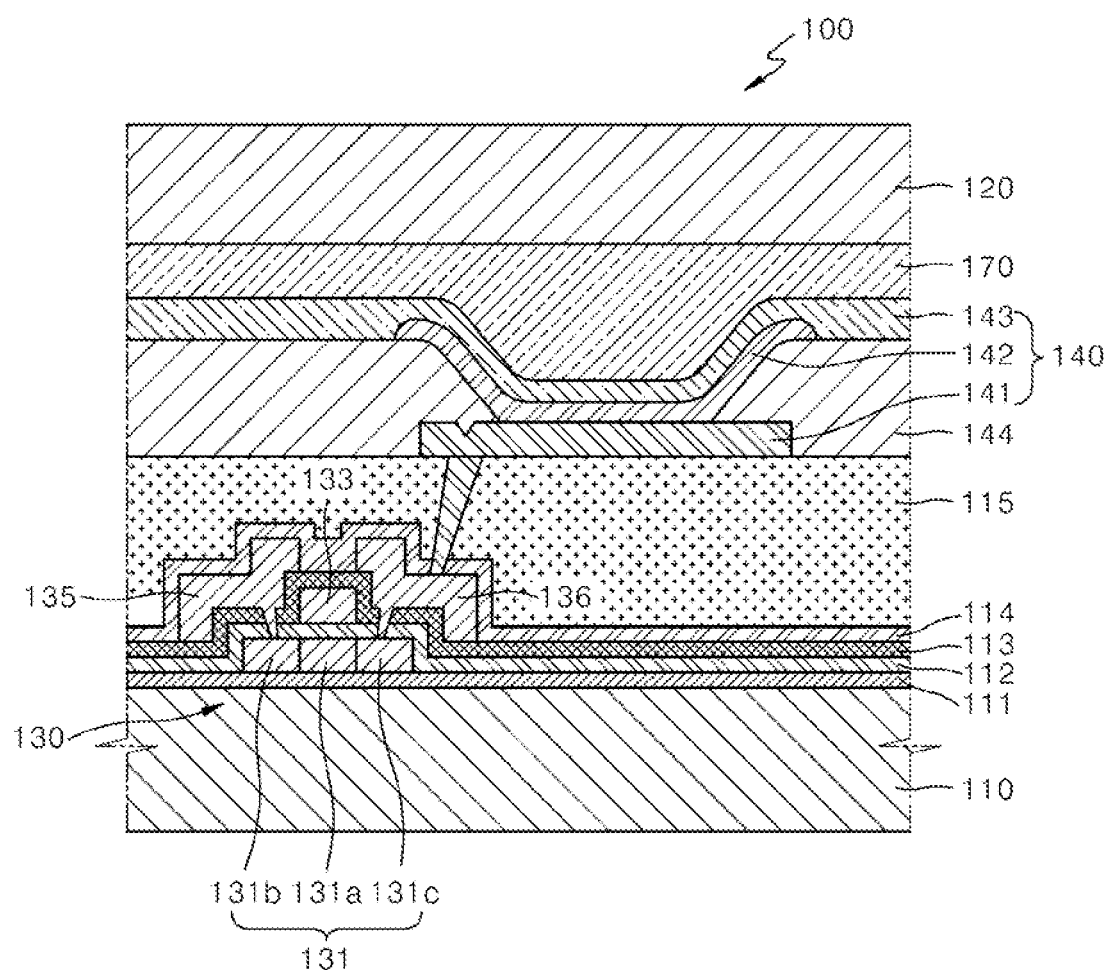

FIG. 8 illustrates a diagram showing a portion of the display panel 100 of FIG. 1 in closer detail.

Referring to FIG. 8, a first substrate 110 and a second substrate 120 facing the first substrate 110 may be arranged. A display portion may be formed on a surface of the first substrate 110, the surface facing the second substrate 120. An encapsulating member 170 may be formed on the display portion. The encapsulating member 170 may seal the display portion between the first substrate 110 and the second substrate 120.

The first substrate 110 may be formed of a transparent glass material based on $SiO_2$. In an implementation, and the first substrate 110 may be formed of any of various suitable materials including transparent plastic materials. Plastic materials for forming the first substrate 110 may include, e.g., an insulating organic material such as polyethersulfone (PES), polyacrylate (PAR), polyetherimide (PEI), polyethylene naphthalate (PEN), polyethylene terephthalate (PET), polyphenylene sulfide (PPS), polyarylate, polyimide, polycarbonate (PC), cellulose triacetate (TAC), or cellulose acetate propionate (CAP).

If the display device is a bottom emission type in which an image is formed toward the first substrate 110, it may be necessary to form the first substrate 110 using a transparent material. However, if the display device is a top emission type in which an image is formed in a direction away from the first substrate 110, it may not be necessary to form the first substrate 110 using a transparent material. In this case, the first substrate 110 may be formed of a metal. If the first substrate 110 is formed of a metal, the first substrate 110 may contain at least one of carbon, iron, chromium, manganese, nickel, titanium, molybdenum, stainless steel (SUS), Invar alloy, Inconel alloy, or Kovar alloy. In an implementation, the first substrate 110 may be formed using a metal foil.

A buffer layer 111 may be further arranged on the first substrate 110 to help improve planarity of the first substrate 110 and to help block permeation of impurity ions.

The display portion may include a plurality of organic light emitting diodes 140 and a plurality of TFTs 130 respectively connected to the organic light emitting diodes 140. Organic light emitting display devices may be categorized into a passive matrix (PM) type and an active matrix (AM) type based on whether driving f the organic light emitting diode 140 is controlled by using the TFT 130. The organic light emitting display device 1000 according to an embodiment may be applied to both an AM type and a PM type. Hereinafter, an AM type organic light emitting display device will be described in detail.

An active layer 131 of the TFT 130 may be formed on the buffer layer 111 using a semiconductor material, and a gate insulation layer 112 may be formed to cover the same. The active layer 131 may be formed of an inorganic semiconductor, such as amorphous silicon or polysilicon, or an organic semiconductor and includes a source region 131b, a drain region 131c, and a channel region 131a arranged therebetween.

A gate electrode 133 may be arranged on the gate insulation layer 112, and an interlayer insulation layer 113 may be formed to cover the same. Furthermore, a source electrode 135 and a drain electrode 136 may be formed on the interlayer insulation layer 113, and a passivation layer 114 and a planarizing layer 115 may be formed in the order stated to cover the same.

The gate insulation layer 112, the interlayer insulation layer 113, the passivation layer 114, and the planarizing layer 115 may be formed as insulators and may be formed of inorganic materials, organic materials, or organic/inorganic composite materials to have a single layer structure or a multi-layer structure. Meanwhile, the TFT stack structure stated above is merely an example, and TFTs of any of various structures may be applied.

A plurality of pad electrodes (not shown) may be arranged outside the display portion, where the pad electrodes are respectively connected to various lines (not shown) arranged at the display portion, e.g., various lines for driving display devices, such as data lines, scan lines, or power supply lines, and transmit outside signals to the organic light emitting diodes arranged at the display portion via the respective lines.

A first electrode 141, which becomes an anode of the organic light emitting diode 140, may be formed on the planarizing layer 115, and a pixel defining layer 144 may be formed of an insulation material to cover the same. After a designated opening is formed in the pixel defining layer 144, an organic layer 142 of the organic light emitting diode 140 may be formed in a region defined by the opening. Next, a second electrode 143, which becomes a cathode of the organic light emitting diode 140, may be formed to cover the entire pixels. Of course, polarities of the first electrode 141 and the second electrode 143 may be reversed.

The organic layer 142 arranged between the first electrode 141 and the second electrode 143 may include one or more layers selected from a an hole injection layer, a hole transport layer, an emission layer, a hole stopping layer, an electron transport layer, and an electron injection layer.

For example, the organic light emitting diode 140 may have a structure in which the first electrode 141, a hole injection layer (HIL) (not shown), a hole transport layer (not shown), an emission layer (EML) (not shown), an electron transport layer (ETL) (not shown), and an electron injection layer (EIL) or the first electrode 141, a HIL (not shown), a HTL (not shown), an EML (not shown), a hole blocking layer (HBL) (not shown), an ETL (not shown), an EIL (not shown), and the second electrode 143 may be stacked in the order stated for once or multiply.

The first electrode 141 may be formed of an anode material having a high work function using a deposition method or sputtering method and may be arranged as a transparent electrode or a reflective electrode. When the first electrode 141 is arranged as a transparent electrode, the first electrode 141 may contain ITO, IZO, $SnO_2$, ZnO or $In_2O_3$. When the first electrode 141 is arranged as a reflective electrode, the first electrode 141 may include a reflective film formed of Ag, Mg, Al, Pt, Pd, Au, Ni, Nd, Ir, Cr, or an alloy thereof and a transparent layer formed of ITO, IZO, ZnO, or $In_2O_3$.

Next, a second electrode 143 may be formed on the organic layer 142 via thermal evaporation of a cathode forming metal. The second electrode 143 may be arranged as a transparent electrode or a reflective electrode. When the second electrode 143 is arranged as a transparent electrode, the second electrode 143 may include a film formed by depositing Li, Ca, LiF/Ca, LiF/Al, Al, Mg, or a compound thereof toward the organic layer 142 and an auxiliary electrode or a bus electrode formed thereon using a transparent conductive material, such as ITO, IZO, ZnO, or $In_2O_3$. When the second electrode 143 is arranged as a reflective electrode, the second electrode 143 may be formed of Li, Ca, Al, Mg, LiF/Ca, LiF/Al, Al/Li, Mg/In, Mg/Ag, or a compound thereof.

Although not shown, a spacer (not shown) for maintaining a gap between the organic light emitting diode 140 and the second substrate 120 may be further arranged on the pixel defining layer 144.

The encapsulating member 170 may be formed on a surface of the first substrate 110 facing the second substrate 120 to cover the display portion. The encapsulating member 170 helps prevent permeation of oxygen and moisture to the organic light emitting diode 140 from outside.

The encapsulating member 170 may include a plurality of stacked insulation layers (not shown), e.g., the plurality of insulation layers may include organic layers and inorganic layers alternately stacked.

The inorganic layers may be formed of an oxide (e.g., a metal oxide), a nitride (e.g., a metal nitride), a metal carbide, or a compound thereof, e.g., aluminum oxide, silicon oxide, or silicon nitride. The inorganic layers may help suppress permeation of moisture and oxygen to the organic light emitting diode 140 from outside. Organic layers may be formed of an organic polymer compound, e.g., an epoxy, an acrylate, and/or a urethane acrylate. The organic layers may help reduce internal stresses of the inorganic layers, may help supplement defects of the inorganic layers, and may help planarize the inorganic layers.

The encapsulating member 170 may include at least one sandwiched structure, in which at least one organic layer is interposed between at least two inorganic layers. In an implementation, the encapsulating member 170 may include at least one sandwiched structure, in which at least one inorganic layer is interposed between at least two organic layers. In an implementation, the encapsulating member 170 may include a sandwiched structure, in which at least one organic layer is interposed between at least two inorganic layers, and a sandwiched structure, in which at least one inorganic layer is interposed between at least two organic layers. The topmost layer of the encapsulating member 170 exposed to outside may be formed as an inorganic layer to prevent permeation of moisture.

In an implementation, an area of a first inorganic layer at the bottom may be smaller than that of a second inorganic layer over the first inorganic layer, and the second organic layer may have a smaller area than the third inorganic layer over the second inorganic layer. In an implementation, the first organic layer at the bottom may be formed to be completely covered by the second inorganic layer, and the second organic layer over the third inorganic layer may also be formed to be completely covered by the third inorganic layer.

Referring back to FIGS. 1 and 2, the resin layer 500 may be arranged between the window 400 and the display panel 100.

The resin layer 500 may be arranged between the display panel 100 and the window 400 and between the display panel 100 and the housing member 600, thereby surrounding the display panel 100. At the same time, the resin layer 500 may surround the display panel 100, formation of air gaps between the display panel 100 and the window 400 and between the display panel 100 and the housing member 600 may be prevented, and intrusion of foreign substances, such as dust, between the display panel 100 and the window 400 and between the display panel 100 and the housing member 600 may be reduced and/or prevented. Therefore, distortion of an image displayed by the display panel 100 by an air gap formed between the display panel 100 and the window 400 or a foreign substance existing between the display panel 100 and the window 400 may be prevented.

Furthermore, the resin layer 500 may adhere the window 400 to the display panel 100, thereby protecting the display panel 100 together with the window 400. As a result, shock-resistance of the display device 1000 may be improved.

The housing member 600 may accommodate the display panel 100 and may be formed of a stronger material than the window 400. The housing member 600 may be formed of a stainless steel, a cold rolled carbon steel, aluminum-nickel-silver alloy, or the like.

Meanwhile, although not shown in FIGS. 1 and 2, functional layers, e.g., for preventing reflection or fingerprints, may be additionally formed on the window 400.

Therefore, the window 400 according to embodiments may secure excellent hardness property, thereby reducing surface scratches.

Furthermore, the window 400 and the base member 200 may help maintain flexibility, and thus the flexible display device 1000 may be embodied.

By way of summation and review, glass may be used as a window member. Glass may be vulnerable to an external shock. For example, if glass is applied to a mobile device, such as a mobile phone, it may be easily damaged.

Window members formed of plastic materials instead of glass materials may be considered. Display devices with touch screens may be used, and scratches may be easily formed on surfaces of window members formed of plastic materials.

Due to increased demands for flexible display devices, window members may be flexible to handle external stress.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A display device, comprising:
a substrate;
a plurality of organic light emitting diodes on the substrate, each of the plurality of organic light emitting diodes including a first electrode, a second electrode, and an organic emitting layer between the first electrode and the second electrode;
an encapsulating member covering the plurality of organic light emitting diodes; and
a window on the encapsulating member, the window including:
a base member; and
a coating layer, the coating layer being disposed on an outer surface of the base member such that the base member is between the coating layer and the encapsulating member, wherein
the coating layer includes core particles,
each core particle has a plurality of polymer ligands that are grafted onto surfaces thereof,
the plurality of polymer ligands form bonds to the base member,
the window is disposed at an outermost side of the display device, and
the coating layer forms an outermost surface of the window.

2. The display device as claimed in claim 1, wherein the base member is formed of polyethylene terephthalate, polyimide, polycarbonate, polymethylmethacrylate, polyethylene, polyurethane, silicone, or polyisoprene.

3. The display device as claimed in claim 2, wherein a material constituting the polymer ligand is secondarily bonded with the base member via hydrogen bonding or van der Waals bonding.

4. The display device as claimed in claim 1, wherein the polymer ligand has a number average molecular weight of 10,000 g/mol or greater.

5. The display device as claimed in claim 1, wherein the core particles include a metal oxide, a metalloid oxide, a compound of a metal oxide, or a compound of a metalloid oxide.

6. The display device as claimed in claim 1, wherein the core particles have a grain size of about 10 nm or greater.

7. The display device as claimed in claim 1, wherein the coating layer has a thickness that is 10% or greater of a thickness of the base member.

8. The display device as claimed in claim 1, wherein the polymer ligand is formed of a block copolymer.

9. The display device as claimed in claim 1, wherein the core particles of the coating layer are discontinuously distributed on the base member.

10. A display device, comprising:
a substrate;
a plurality of organic light emitting diodes on the substrate, each of the plurality of organic light emitting diodes including a first electrode, a second electrode, and an organic emitting layer between the first electrode and the second electrode;
an encapsulating member covering the plurality of organic light emitting diodes; and
a window on the encapsulating member, the window including:
a base member; and
a coating layer, the coating layer being disposed on an outer surface of the base member such that the base member is between the coating layer and the encapsulating member, wherein
the coating layer includes core particles,
each core particle has a plurality of polymer ligands that are grafted onto surfaces thereof,
each of the plurality of polymer ligands has at least one reactive group at a terminal end thereof,
the window is disposed at an outermost side of the display device, and
the coating layer forms an outermost surface of the window.

11. The display device as claimed in claim 10, wherein the base member is formed of polyethylene terephthalate, polyimide, polycarbonate, polymethylmethacrylate, polyethylene, polyurethane, silicone, or polyisoprene.

12. The display device as claimed in claim 11, wherein a material constituting the polymer ligand is secondarily bonded with the base member via hydrogen bonding or van der Waals bonding.

13. The display device as claimed in claim 10, wherein the polymer ligand has a number average molecular weight of 10,000 g/mol or greater.

14. The display device as claimed in claim 10, wherein the core particles include a metal oxide, a metalloid oxide, a compound of a metal oxide, or a compound of a metalloid oxide.

15. The display device as claimed in claim 10, wherein the core particles have a grain size of about 10 nm or greater.

16. The display device as claimed in claim 10, wherein the coating layer has a thickness that is 10% or greater of a thickness of the base member.

17. The display device as claimed in claim 10, wherein the polymer ligand is formed of a block copolymer.

* * * * *